(12) United States Patent
Van Der Meer et al.

(10) Patent No.: US 11,319,222 B2
(45) Date of Patent: May 3, 2022

(54) METHOD AND PROCESS ARRANGEMENT OF REMOVING CATIONS FROM WATER

(71) Applicant: OUTOTEC (FINLAND) OY, Espoo (FI)

(72) Inventors: Tuomas Van Der Meer, Espoo (FI); Annukka Mäkinen, Sastamala (FI); Mika Martikainen, Espoo (FI); Niko Isomäki, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 16/174,371

(22) Filed: Oct. 30, 2018

(65) Prior Publication Data

US 2019/0084845 A1 Mar. 21, 2019

Related U.S. Application Data (63) Continuation of application No. PCT/FI2016/050294, filed on May 6, 2016.

(51) Int. Cl.
*C02F 1/463* (2006.01)
*C02F 1/461* (2006.01)
(Continued)

(52) U.S. Cl.
CPC .......... *C02F 1/463* (2013.01); *C02F 1/46109* (2013.01); *C02F 1/24* (2013.01);
(Continued)

(58) Field of Classification Search
CPC .................................................... C02F 1/463
See application file for complete search history.

(56) References Cited

U.S. PATENT DOCUMENTS

| 3,933,606 A | 1/1976 | Harms |
| 4,156,644 A | 5/1979 | Richard |
| (Continued) | | |

FOREIGN PATENT DOCUMENTS

| WO | WO-9920569 A1 | 4/1999 |
| WO | WO-2015048907 A1 | 4/2015 |

OTHER PUBLICATIONS

Baek, K. et al., "Electrochemical Removal of Selenate From Aqueous Solution", The Chemical Engineering Journal, (20130100), pp. 215-216, XP055438241 [X] 1, 3,4,10,12 *, abstract, pp. 678-684 * DOI: http://dx.doi.org/10.1016/j.cej.2012.09.135 (8 pages).

(Continued)

*Primary Examiner* — Peter Keyworth
(74) *Attorney, Agent, or Firm* — Robert P. Michal, Esq.; Carter, DeLuca & Farrell LLP (57) ABSTRACT

A method of removing cations from water and a process arrangement for performing the method, wherein the method includes containing cations selected from a group consisting of Se, As, Sb, Cr, Mn, Mo, W, V, Te, P, Si including preparing an iron precipitate-containing sludge by electrochemical water treatment, wherein the water is led through an electrochemical water treatment unit, wherein electricity dissolves iron from an anode to the water thereby forming an iron precipitate-containing sludge to which cations to be removed are adsorbed/co-precipitated, adsorption and co-precipitation enhancing to provide a very high density sludge having an iron precipitate concentration of 50-400 g/l thereby further adsorbing cations contained in the water, and separating solids from the obtained sludge thereby producing treated water having a reduced cation content and solids comprising iron precipitate compounds and adsorbed/co-precipitated cation compounds.

11 Claims, 4 Drawing Sheets

(51) Int. Cl.
    *C02F 1/38*        (2006.01)
    *C02F 1/44*        (2006.01)
    *C02F 101/10*      (2006.01)
    *C02F 1/24*        (2006.01)
    *C02F 1/00*        (2006.01)
    *C02F 101/20*      (2006.01)
    *C02F 101/22*      (2006.01)

(52) U.S. Cl.
    CPC ............... *C02F 1/38* (2013.01); *C02F 1/444*
        (2013.01); *C02F 2001/007* (2013.01); *C02F
            2001/46133* (2013.01); *C02F 2101/103*
        (2013.01); *C02F 2101/106* (2013.01); *C02F
        2101/20* (2013.01); *C02F 2101/206* (2013.01);
            *C02F 2101/22* (2013.01); *C02F 2201/4614*
            (2013.01); *C02F 2301/046* (2013.01)

(56) References Cited

U.S. PATENT DOCUMENTS

| | | |
|---|---|---|
| 4,318,788 A | 3/1982 | Duffey |
| 4,405,464 A | 9/1983 | Baldwin et al. |
| 4,872,959 A | 10/1989 | Herbst et al. |
| 5,510,040 A | 4/1996 | Miller et al. |
| 5,531,865 A | 7/1996 | Cole |
| 5,633,423 A | 5/1997 | Federici et al. |
| 2008/0185293 A1 | 8/2008 | Klose et al. |
| 2014/0217015 A1* | 8/2014 | Larsen .................... C02F 3/006 210/605 |
| 2014/0246375 A1* | 9/2014 | Gharibi .................. C02F 1/463 210/721 |
| 2016/0289092 A1* | 10/2016 | Kratochvil ............. C02F 1/442 |

OTHER PUBLICATIONS

International Search Report issued by the Finnish Patent and Registration Office acting as the International Searching Authority in relation to International Application No. PCT/FI2016/050294 dated Aug. 26, 2016 (5 pages).

Written Opinion of the International Searching Authority issued by the Finnish Patent and Registration Office acting as the International Searching Authority in relation to International Application No. PCT/FI2016/050294 dated Aug. 26, 2016 (8 pages).

International Preliminary Report on Patentability issued by the Finnish Patent and Registration Office acting as the International Preliminary Examining Authority in relation to International Application No. PCT/FI2016/050294 dated Jul. 3, 2018 (7 pages).

Extended European Search Report issued by the European Patent Office in relation to European Application No. 16901045.1 dated Sep. 18, 2 019 (13 pages).

* cited by examiner

METHOD AND PROCESS ARRANGEMENT OF REMOVING CATIONS FROM WATER

CROSS-REFERENCE TO RELATED APPLICATIONS

This application is a continuation of PCT International Application No. PCT/FI2016/050294 filed May 6, 2016, the disclosure of which is expressly incorporated herein by reference in its entirety.

FIELD OF THE INVENTION

The present invention relates to a method and process arrangement of treating water.

BACKGROUND OF THE INVENTION

Technologies and Potential Technologies for Removing Selenium from Process and Wastewater, Proceedings REWAS'99, Eds. I. Gaballah, J. Hager, R. Solozaral, Global Symposium on Recycling, Waste Treatment and Clean Technology, San Sabastian, Spain, Sep. 5-9, 1999, pp 1645-56, discloses technologies for removing selenium.

Review of Available Technologies for the Removal of Selenium from Water, prepared for North American Metals Council, published in June 2010, discloses technologies for removing selenium.

U.S. Pat. No. 4,405,464 discloses a process for reducing the concentration of selenium ions in the Se(VI) oxidation state in an aqueous solution.

WO 99/20569 discloses a continuous process for removing selenium from a selenium containing waste water stream.

U.S. Pat. No. 5,510,040 discloses a method for the removal of soluble selenium compounds from an aqueous liquid containing soluble selenite and selenite compounds.

BRIEF DESCRIPTION OF THE INVENTION

The method and apparatus of the invention refers to removing cation(s), such as Se, As, Sb, Cr, Mn, Mo, W, V, Te, P, Si from process streams and effluents to very low levels. Especially suitable the present invention is for removing Se, As and/or Sb. Typically the cations are in the water as oxyanions, thus the cations listed here can be removed from the water as oxyanions, as cations, as part of organic complexes or in any other suitable form they are contained in the water to be treated. The process and process arrangement of the present invention differ from conventional methods and apparatuses, like adsorption or coagulation, in that there is no need for separate reduction or oxidation step to reduce or oxidize the cations to have a suitable oxidation state, such as Se (VI) to Se (IV). Nor is there need for a separate removal step for other ions like sulfate which usually interfere cation removal, such as selenium removal, when using conventional methods.

The process consists of a cation removal step in which dissolved cation concentration is decreased by co-precipitation/adsorption by iron precipitate sludge. The iron precipitate is produced by electrochemical water treatment. In an embodiment of the invention the iron precipitate sludge concentration is kept high, i.e. densified, by circulating at least part of the solids back to the process minimizing the need for fresh iron precipitate formation. The solids in the cation removal step are separated and densified with a solid-liquid separator, such as a clarifier before recycling part of the solids back to the removal step. Rest of the solids, which are not being circulated, are disposed e.g. after further densifying by filtration. Clarification and filtration of the solids and the methods of carrying it out can be case wise optimized.

Typically, the fresh iron precipitate needed can be formed by using electrochemical water treatment equipment unit, such as Outotec's EWT-40. In this option water to be treated flows through electrochemical water treatment in which electricity dissolves iron from anode to the water forming iron precipitate-containing sludge. Electrochemical water treatment already removes part of the cations decreasing the concentration of cations to be removed entering the VHDS (Very High Density Sludge) process step. The need for fresh iron precipitate can be defined case wise and depends on e.g. the chemistry of the water to be treated and presence of other impurities. The fresh iron precipitate production is mainly defined by adjusting current density (A/m2) and charge loading (C/m3) in the electrochemical water treatment process The achieved residual specific cation concentration can be as low as <0.01 mg/L per one species of cations. The achievable cation level depends on the cation to be removed, used current density or charge loading in electrochemical water treatment, solids density of recycled iron precipitate and solution chemistry (e.g. presence of other anions, pH and redox potential).

EPA's Best Demonstrated Available Technology (BDAT) for selenium removal is iron precipitate or oxyhydroxide adsorption. Other possible technologies are for example activated alumina adsorption, ferric coagulation, filtration, biological reduction and electrocoagulation. To be effective, usually reduction of Se (VI) to Se (IV) is required when using these technologies. In addition, the presence of other anions, especially sulfate, may decrease cation, such as selenium removal efficiency. The present invention alleviates these disadvantages. Furthermore, the present invention has following advantages: iron consumption/electricity consumption for iron precipitate sludge production can be minimized as a large portion of the solids recycled back to the process to reach very high density sludge. The present method is found to be effective for both Se(IV) and Se (VI) removal, there is no need for separate reduction step. It was also found out that the present method is efficient in the presence of dissolved sulfate (gypsum saturated water). By the present method also formation of lesser amount of solid product due to solids recycling is achieved.

DETAILED DESCRIPTION OF THE INVENTION

According to an aspect, the present invention relates to a method of removing cation(s) from water containing cation(s) selected from a group consisting of Se, As, Sb, Cr, Mn, Mo, W, V, Te, P, Si, comprising a) preparing an iron precipitate-containing sludge by electrochemical water treatment, wherein the water is led through an electrochemical water treatment unit, wherein electricity dissolves iron from an anode to the water thereby forming an iron precipitate-containing sludge to which cations to be removed are adsorbed/co-precipitated, c) separating solids from the obtained sludge thereby producing treated water having a reduced cation content and solids comprising iron precipitate compounds and adsorbed/co-precipitated cation impurity compounds.

Typically the water is a process stream or effluent from a mining and/or metallurgical process, but the method can be applied to any suitable water or waste water from which cations are desired to be removed. The cations to be removed can also be others than Se, As, Sb, Cr, Mn, Mo, W, V, Te, P, Si. Typically the cations to be removed are selenium(IV), selenium(VI), arsenic and/or antimony. Typically the cations are in the water as oxyanions, thus the cations listed here can be removed from the water as oxyanions, as cations, as part of organic complexes or in any other suitable form they are contained in the water to be treated.

The electrochemical water treatment is performed in an electrochemical water treatment unit, which comprises an iron anode, from which iron is dissolved into the water as ferrous or ferric iron depending on the current density/charge loading used and a cathode made of iron or any other suitable materials. The iron dissolved from the anode forms iron precipitate-containing sludge, wherein the iron precipitate typically comprises iron hydroxide, such as ferric hydroxide and/or ferrous hydroxide, iron oxide or any other suitable iron precipitate compound formed in the water. The current density and/or charge loading in the electrochemical water treatment unit is adjusted to produce the required amount of iron precipitate for adequate removal of cations. The current density or charge loading required will depend on the composition of the water to be treated, mainly it's conductivity and amount of all impurities to be treated. Typically the current density in the electrochemical water treatment step is adjusted to a level of 10-500 $A/m^2$. Typically the charge loading is adjusted to a level of 0.1-10 $MC/m^3$. Typically the electrochemical water treatment is performed by any suitable electrochemical water treatment unit wherein iron is dissolved into the water, such as Outotec's EWT-40 equipment, which comprises an electrochemical water treatment tank equipped with a set of anodes and cathodes though which the water to be treated flows through.

The iron precipitate-containing sludge formed by the electrochemical water treatment step comprises iron precipitate 0.1-2 g/l, more typically 0.5-1.5 g/l.

The cations start to adsorb and co-precipitate already during the electrochemical water treatment step as soon as the iron precipitate compounds, such as ferric or ferrous hydroxide, starts to form. The adsorption and co-precipitation of the cations to be removed is further enhanced in the solid-liquid separation step, which simultaneously separates the solids from the liquid and also provides retention time for the adsorption/co-precipitation of the cation to proceed further. In other words, the solid-liquid separation step can be used as a very high density sludge process step, wherein the water is allowed to pass through a bed of solids formed of iron precipitate in the solid-liquid separation step thereby enabling adsorption/co-precipitation of the cations to the bed of solids.

Typically the method further comprises, typically between steps a) and c), an enhanced adsorption and co-precipitation step b) comprising b) adsorption and co-precipitation enhancing step providing a very high density sludge having an iron precipitate concentration of 50-400 g/l thereby further adsorbing and co-precipitating cations contained in the water. Step b) is especially suitable for removing selenium (VI).

Typically, after the electrochemical water treatment, the iron precipitate concentration of the iron precipitate-containing sludge is typically adjusted in the densifying step, i.e. in the solid-liquid separation step functioning as a very high density sludge process step and/or in the adsorption and co-precipitation enhancing step, to a level of 50-400 g/l, more typically 100-350 g/l, even more typically to a level of 150-250 g/l. In this way a very high density sludge is formed and the adsorption and co-precipitation of the cations to be removed from the waste water is enhanced further. Thus, the very high density sludge can be contained either in method step b) or in method step c) or in both.

It was surprisingly found out that the method of the present invention is especially suitable for removing selenium(VI) ($Se^{6+}$) from waste water, especially when the method comprises the adsorption and co-precipitation enhancing step b). It was found out that the present process differs from conventional methods, like adsorption or coagulation, in that there is no need for separate reduction step to reduce Se (VI) to Se (IV) or separate removal step for other ions like sulfate which usually interfere selenium removal when using conventional methods.

The adsorption and co-precipitation enhancing step is typically performed in a tank or reactor to which both fresh and re-circulated iron precipitate is provided. Thus, the concentration of iron precipitate in the sludge is densified to a desired level by adjusting concentration of the sludge contained in the adsorption and co-precipitation enhancing step. An option to adjust the iron precipitate concentration of the iron precipitate-containing sludge to a desired level is by re-circulating at least part of the solids comprising iron precipitate and adsorbed/co-precipiated cations obtained in step c) back to the process step b). It is also possible to re-circulate all of the solids separated in step c) back to the step b). Recirculation rate depends on the S/L separation step (device) used and slurry density obtained in it and how this allows the production of the VHDS requirements. Recirculation rate of the solids typically varies between 50-100%, more typically 80-95%. Thus, the very high density iron precipitate-containing sludge may also be obtained by mixing fresh iron precipitate obtained by electrochemical water treatment and re-circulated part of the solids comprising iron precipitate.

The solid-liquid separation may be performed by any suitable solid-liquid separation method, such as clarifier, thickener, hydrocyclone, dissolved air flotation or ultrafiltration.

The method of the present invention may be controlled by measuring a difference between the inlet and outlet redox potentials, by measuring changes in conductivity and/or change in pH. Typically the difference between the inlet and outlet redox is ±50-±200 mV. pH is typically in the range of 4 to 8.

The present invention relates also to a process arrangement for performing the method of the present invention, wherein the arrangement comprises a) an electrochemical water treatment unit, wherein the water is led through an electrochemical water treatment unit and electricity dissolves iron from an anode to the water thereby forming an iron precipitate-containing sludge to which cations to be removed are adsorbed/co-precipitated, c) a solid-liquid separation unit, wherein solids are separated from the obtained sludge thereby producing treated water having a reduced cation content and solids comprising iron precipitate compounds and adsorbed/co-precipitated cation compounds.

The process arrangement of the present invention may also comprise a) an electrochemical water treatment unit, wherein the water is led through an electrochemical water treatment unit and electricity dissolves iron from an anode to the water thereby forming an iron precipitate-containing sludge to which cations to be removed are adsorbed/co-precipitated, b) an adsorption and co-precipitation unit containing a very high density sludge having an iron precipitate concentration of 50-400 g/l thereby further adsorbing cations contained in the water, c) a solid-liquid separation unit, wherein solids are separated from the obtained sludge thereby producing treated water having a reduced cation content and solids comprising iron precipitate compounds and adsorbed/co-precipitated cation compounds In addition to the above, the arrangement comprises a connection from the solid-liquid separation unit to the adsorption and co-precipitation unit for re-circulating at least part of the solids separated in the solid-liquid separation unit back to the adsorption and co-precipitation unit.

Figure 7:
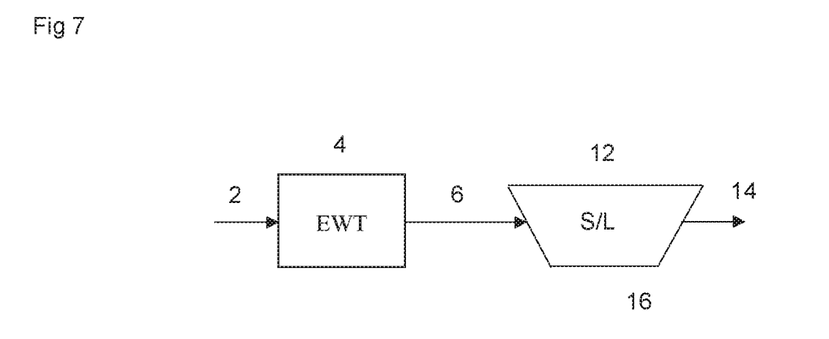
FIG. 7 presents a flow diagram of an example embodiment of the present invention.
Figure 8:
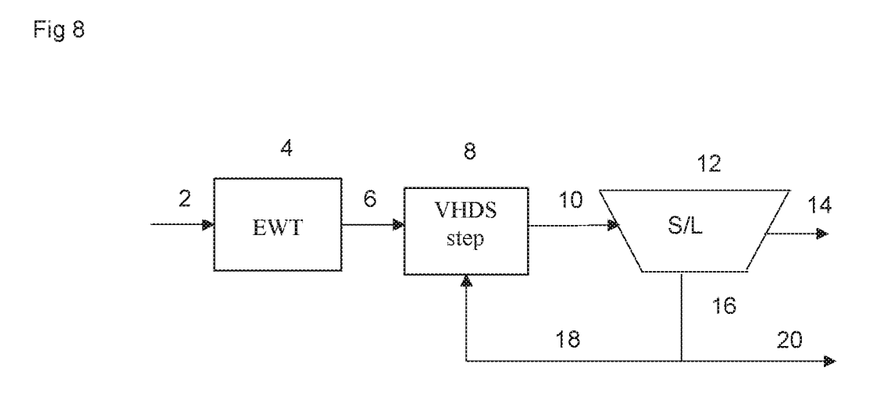
FIG. 8 presents a flow diagram of an example embodiment of the present invention.

Reference is now made to FIGS. 7 and 8 and 9. The following reference numbers correspond to the following meanings:
- 2 water to be treated
- 4 electrochemical water treatment
- 6 iron precipitate-sludge
- 8 adsorption/co-precipitation enhancing (Very High Density Sludge step)
- 10 very high density iron precipitate-sludge
- 12 solid-liquid separation
- 14 treated water
- 16 solids containing iron precipitate and removed cations
- 18 recirculated solids
- 20 solids to be managed by further processes FIG. 7 discloses a flow diagram of an example embodiment of the present method. Water 2 to be treated containing cations selected from the group consisting of Se, As, Sb, Cr, Mn, Mo, W, V, Te, P, Si, is directed to electrochemical water treatment step 4, wherein iron is released from an anode to the water thereby forming iron precipitate sludge. Typically the iron precipitate concentration at this step is 0.1-2 g/l. From the electrochemical water treatment step 4 the iron precipitate sludge 6 is directed to a solid-liquid separation step 12, typically a clarifier, thickener, hydrocyclone, dissolved air flotation or ultrafiltration, wherein the iron precipitate sludge obtained from electrochemical water treatment 4 is subjected to solid-liquid separation. From the solid-liquid separation step 12 treated water 14 having a reduced cation content (depending on the cations present in the water treated) is obtained. In addition to that solids containing iron precipitate and cations 16 is also obtained as the solid fraction. This embodiment of the invention is based on the use of the S/L separation step as the VHDS step, e.g. by utilizing e.g. the clarifier solid bed for passing the water through it in order to further reduce the cation content.

FIG. 8 discloses a flow diagram of an example embodiment of the present method, wherein in addition to what has been presented in connection with FIG. 7, the method comprises an adsorption and co-precipitation enhancing step 8 (a very high density sludge step), to which the iron precipitate sludge 6 obtained from the electrochemical water treatment step 4 is directed. In the very high density sludge step the concentration of the iron precipitate is typically densified to be between 50-400 g/l. In the very high density sludge step 8 cations are further adsorbed to the iron precipitate sludge. From step 8 the very high density sludge 10 is directed to solid-liquid separation 12, such as clarifier, thickener, hydrocyclone, dissolved air flotation or ultrafiltration, wherein solids 16 are separated from the treated water 14. The separated solids are further divided into two parts, and a first part is recirculated as stream 18 back to step 8. In this way the iron precipitate concentration in step 8 can be adjusted to a desired level. The remaining part of the solids 20 can be directed to further processes, such as filtration or discarded as such. It is also possible to re-circulate all of the solids 16 back to the densifying step 8.

EXAMPLES

Very high density sludge process for selenium removal was tested with several laboratory batch tests. Synthetic waste water was used in all batch tests. Iron precipitate sludge was produced in separate reactor adding iron chemical and adjusting pH to 5 using NaOH. After 1 h mixing produced iron precipitate sludge was filtered using filter paper finally producing iron precipitate sludge having Iron precipitate solid density of 20-30%. Iron precipitate sludge and selenium containing test water were mixed 60 min in VHDS reactor. iron precipitate Samples were taken after 30 min and 60 min mixing. There were no significant changes in selenium concentrations after 30 min mixing. In some tests first samples were taken after few minutes mixing and similar results were obtained than after 60 min mixing. When using ferric chloride for iron precipitate sludge production, tested parameters were iron precipitate sludge density, oxidation state of selenium (Se(IV)/Se(VI)) and presence of dissolved sulfate in test water and initial concentration of selenium. In Tables 1-3 are shown the tested parameters using ferric chloride for sludge production and achieved residual selenium concentration.

TABLE 1

Batch test results: effect of sludge density on removal of $Se^{4+}$ and $Se^{6+}$

| Ferrihydroxide sludge density (%) | Se oxidation state | Initial SO4 (mg/L) | Residual SO4 (mg/L) | Initial Se (mg/L) | Residual Se (mg/L) |
|---|---|---|---|---|---|
| 2.5 | $Se^{4+}$ | — | — | 1 | <0.01 |
| 8.5 | $Se^{4+}$ | — | — | 1 | <0.01 |
| 15 | $Se^{4+}$ | — | — | 1 | <0.01 |
| 20 | $Se^{4+}$ | — | — | 1 | 0.017 |
| 1 | $Se^{6+}$ | 1830 | 1131 | 1 | 0.57 |
| 2.5 | $Se^{6+}$ | 1830 | 183 | 1 | 0.1 |
| 5 | $Se^{6+}$ | 1830 | 6 | 1 | <0.01 |
| 8.5 | $Se^{6+}$ | 1650 | 34 | 1 | 0.011 |

TABLE 2

Batch test results: effect of initial concentration of selenium

| Ferrihydroxide sludge density (%) | Se oxidation state | Initial SO4 (mg/L) | Residual SO4 (mg/L) | Initial Se (mg/L) | Residual Se (mg/L) |
|---|---|---|---|---|---|
| 8.5 | $Se^{6+}$ | 2043 | 34 | 0.6 | <0.01 |
| 8.5 | $Se^{6+}$ | 2055 | 34 | 12 | 0.13 |
| 8.5 | $Se^{6+}$ | 2106 | 38 | 61 | 0.75 |
| 8.5 | $Se^{6+}$ | 2406 | 68 | 128 | 2.58 |

TABLE 3

Batch test results: effect of initial concentration of sulfate

| Ferrihydroxide sludge density (%) | Se oxidation state | Initial SO4 (mg/L) | Residual SO4 (mg/L) | Initial Se (mg/L) | Residual Se (mg/L) |
|---|---|---|---|---|---|
| 8.5 | $Se^{6+}$ | 2601 | 68 | 1.1 | <0.01 |
| 8.5 | $Se^{6+}$ | 3146 | 135 | 1.1 | 0.029 |
| 8.5 | $Se^{6+}$ | 4165 | 378 | 1.1 | 0.056 |

Residual selenium concentrations were measured after 1 h mixing but similar results were obtained right after iron precipitate sludge addition, i.e. in few minutes. This indicates that using very high density sludge process even short retention time allows the efficient removal of selenium. From table 1 can be seen that selenite ($Se^{4+}$) is removed better when using lower sludge concentration than selenate ($Se^{6+}$). However, when having enough iron precipitate sludge (>5%) also selenate is removed to very small residual concentrations. Initial concentration of selenate affects on residual selenate concentration achieved (Table 2). Sulfate affects slightly on selenium removal (Table 3) and it can be seen that also dissolved sulfate is removed during the process.

EWT was tested for selenium removal with several laboratory tests and results are shown in FIGS. 1-6. Synthetic water containing selenium was used as test water. 5 L of test water was pumped through electrochemical water treatment cell. Samples were collected just after electrochemical treatment and after 1 h mixing after electrochemical treatment. Parameters tested in electrochemical iron precipitate sludge production and selenium removal were retention time (RT), pH of test water (adjusted using NaOH/HCl), current density, selenium concentration and sulfate concentration.

Figure 1:
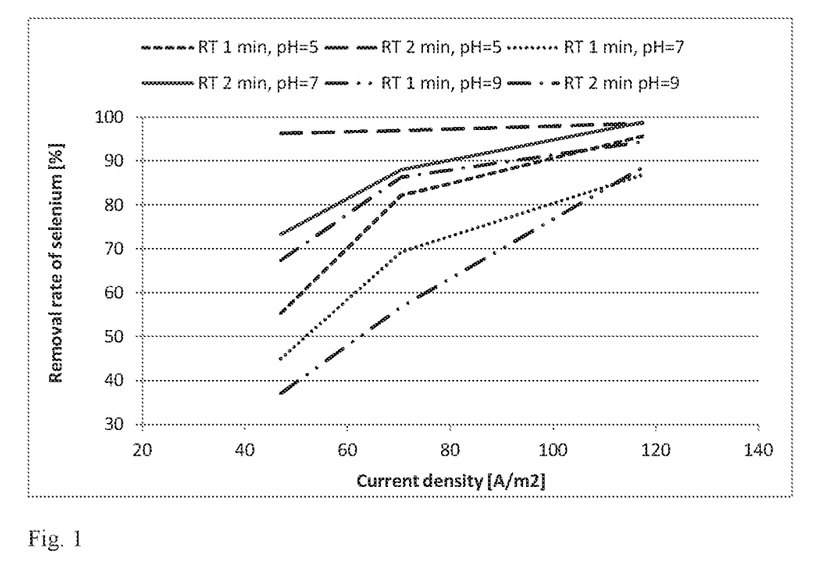
FIG. 1. Effect of retention time (RT), pH and current density on $Se^{6+}$ removal. Initial Se concentration 1 mg/L.
Figure 2:
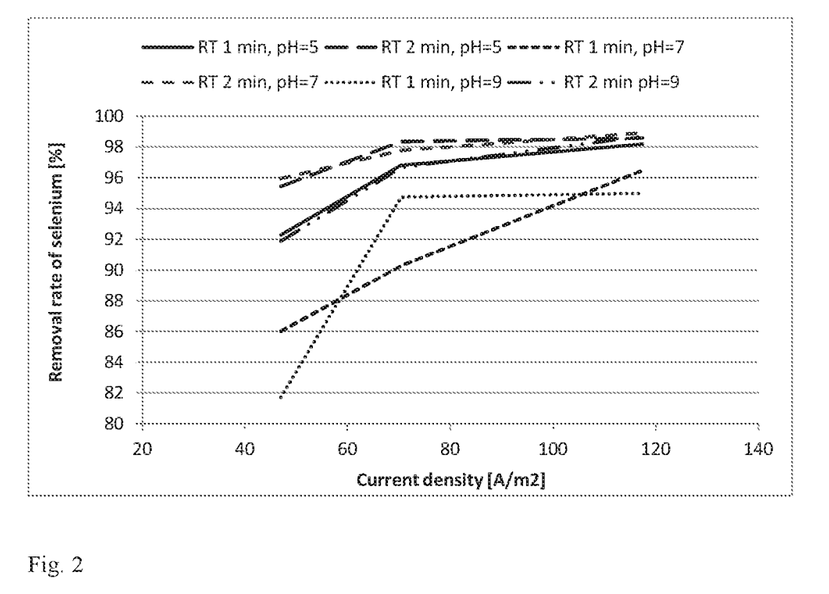
FIG. 2. Effect of retention time (RT), pH and current density on $Se^{4+}$ removal. Initial Se concentration 1 mg/L.
Figure 3:
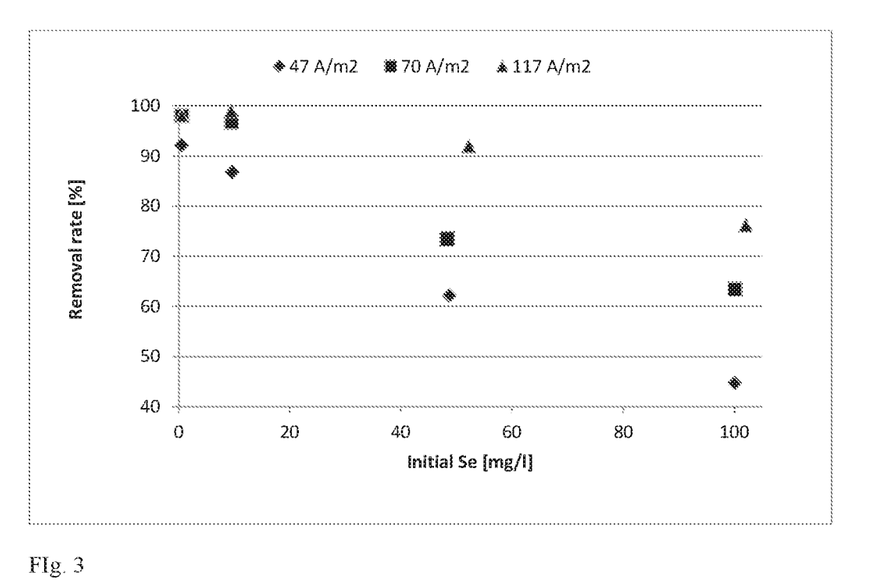
FIG. 3. Effect of current density and initial $Se^{6+}$ concentration on $Se^{6+}$ removal. All tests done at pH 5 and using RT of 2 min.
Figure 4:
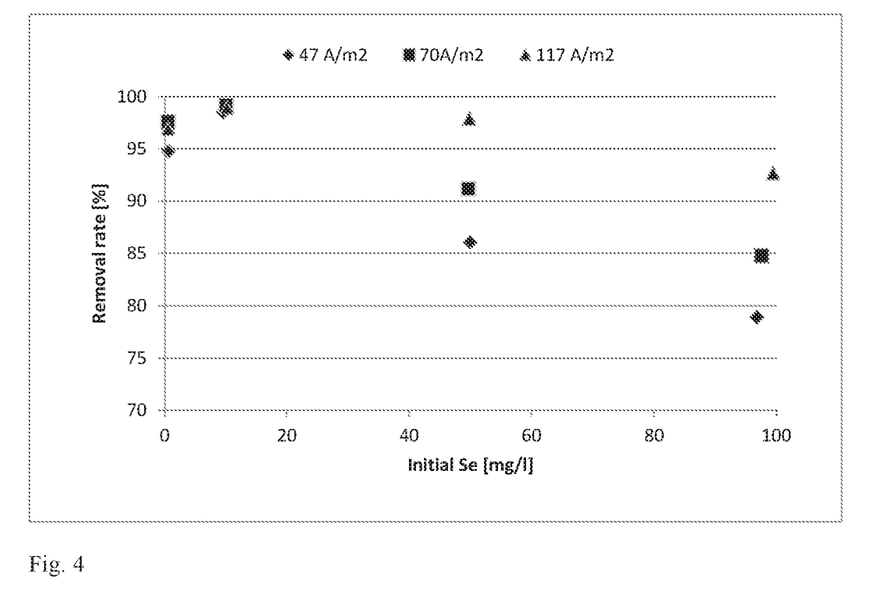
FIG. 4. Effect of current density and initial $Se^{4+}$ concentration on $Se^{4+}$ removal. All tests done at pH 5 and using RT of 2 min.
Figure 5:
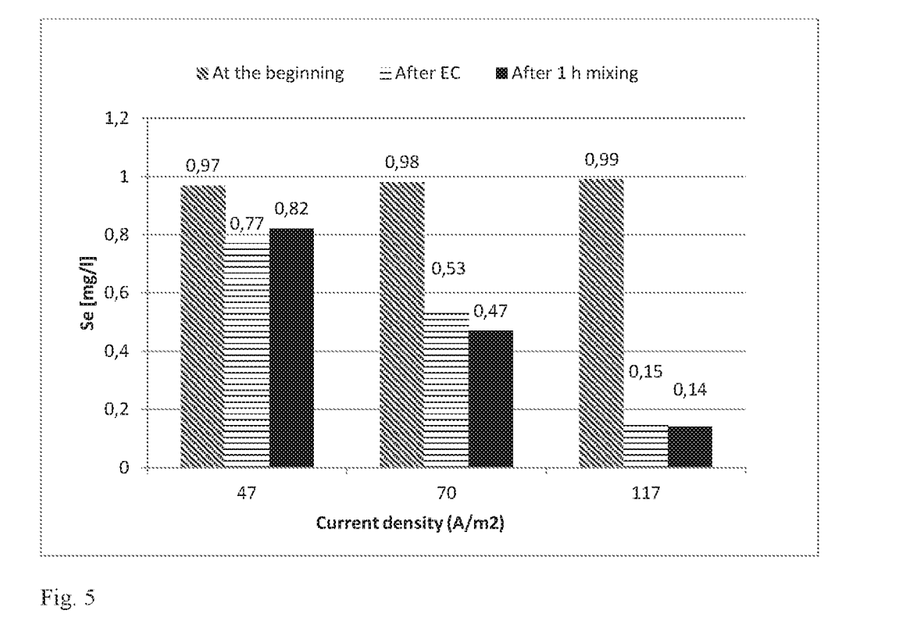
FIG. 5. Effect of current density and initial $SO_4$ concentration (in all tests 2000 mg/L) on $Se^{6+}$ removal. All tests done at pH 5 and using RT of 2 min.
Figure 6:
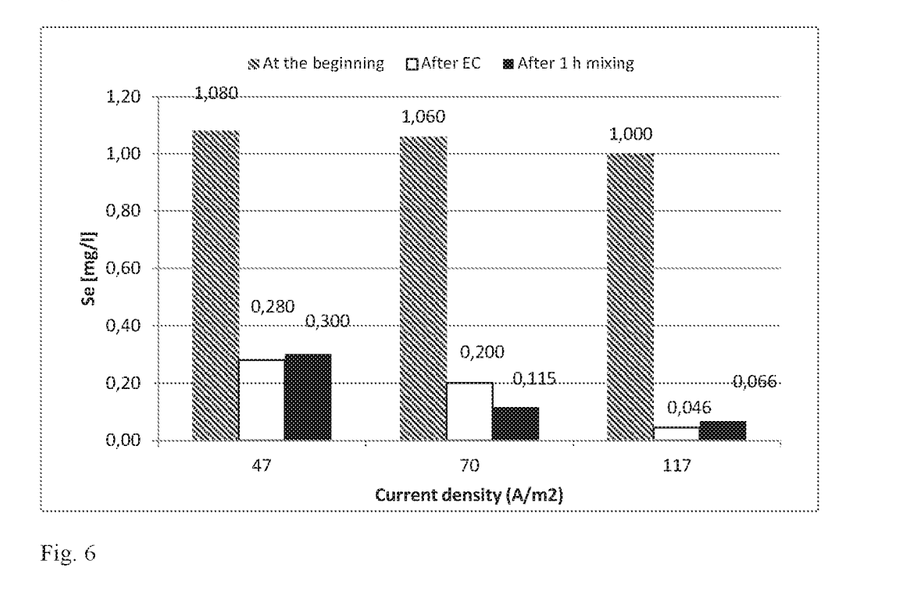
FIG. 6. Effect of current density and initial $SO_4$ concentration (in all tests 2000 mg/L) on $Se^{4+}$ removal. All tests done at pH 5 and using RT of 2 min.

According to the test results shown above, $Se^{4+}$ was removed more efficiently in EWT than $Se^{6+}$ when the parameters are not optimized. It can be seen that according to the laboratory tests conducted optimum EWT parameters for this synthetic waste water tested for both $Se^{4+}$ and $Se^{6+}$ were RT 2 min, pH 5 and current density of about 120 A/m² (FIGS. 1-2). When using optimum parameters both $Se^{4+}$ and $Se^{6+}$ were removed efficiently. The most efficient selenium removal results using EWT were reached when treating initial Se concentration <10 mg/L (FIGS. 3-4). Initial dissolved sulfate concentration decreased Se removal (FIGS. 5-6). However, optimum parameters may be defined case wise and may vary depending on the water to be treated. It will be obvious to a person skilled in the art that, as the technology advances, the inventive concept can be implemented in various ways. The invention and its embodiments are not limited to the examples described above but may vary within the scope of the claims.

The invention claimed is:

1. A method of removing selenium (VI) cation(s) from water containing the selenium (VI) cation(s), the method comprising:
   preparing an iron precipitate-containing sludge by electrochemical water treatment in an electrochemical water treatment unit, wherein the water is led through the electrochemical water treatment unit, wherein electricity dissolves iron from an anode to the water thereby forming the iron precipitate-containing sludge to which cations to be removed are adsorbed/co-precipitated;
   densifying the iron precipitate-containing sludge by further adsorbing selenium (VI) cations contained in the water by enhancing adsorption and co-precipitation in an adsorption and co-precipitation unit thereby providing a very high density sludge having an iron precipitate concentration of 85-400 g/l; and
   separating, in a solid-liquid separation unit, solids from the obtained very high density sludge, thereby producing treated water having a reduced cation content, and solids comprising iron precipitate compounds and adsorbed/co-precipitated cation compounds,
   wherein the adsorption and co-precipitation unit is located after the electrochemical water treatment unit and before the solid-liquid separation unit,
   wherein the iron precipitate concentration of the very high density sludge is adjusted by recycling at least part of the separated solids comprising iron precipitate and adsorbed/co-precipitated cations back from the solid-liquid separation unit to the adsorption and co-precipitation unit.

2. The method according to claim 1, wherein the electrochemical water treatment unit comprises an iron anode, from which iron is dissolved into the water as ferrous or ferric iron.

3. The method according to claim 1, wherein the current density in the electrochemical water treatment unit is adjusted to a level of 10-500 A/m2 and/or the charge loading is adjusted to a level of 0.1-10 MC/m3.

4. The method according to claim 1, wherein the iron precipitate-containing sludge formed by the electrochemical water treatment unit comprises iron precipitate 0.1-2 g/l.

5. The method according to claim 4, wherein the iron precipitate-containing sludge formed by the electrochemical water treatment unit comprises iron precipitate 0.5-1.5 g/l.

6. The method according to claim 1, wherein the iron precipitate concentration of the very high density sludge is adjusted to a level of 100-350 g/l in before the solid-liquid separation unit.

7. The method according to claim 6, wherein the iron precipitate concentration of the very high density sludge is adjusted to a level of 200-300 g/l before the solid-liquid separation unit.

8. The method according to claim 1, wherein the iron precipitate concentration of the very high density sludge is adjusted to a desired level by re-circulating at least a part or all of the solids comprising iron precipitate and adsorbed/co-precipitated cations obtained before the solid-liquid separation unit.

9. The method according to claim 1, wherein the iron precipitate-containing sludge is obtained by mixing fresh iron precipitate obtained by electrochemical water treatment and re-circulated part of the solids comprising iron precipitate.

10. The method according to claim 1, wherein the separating of solids from the very high density sludge is performed by clarifier, thickener, hydrocyclone, dissolved air flotation or ultrafiltration.

11. The method according to claim 1, wherein in the solid-liquid separation unit the water is allowed to pass through a bed of solids formed of iron precipitate in the solid-liquid separation unit thereby enabling adsorption/co-precipitation of the cations to the bed of solids.

\* \* \* \* \*